June 26, 1934.  A. ROSNER  1,964,178
BRAKE LINING
Filed Oct. 27, 1930

INVENTOR.
ADOLPH ROSNER
BY H. O. Clayton
ATTORNEY

Patented June 26, 1934

1,964,178

UNITED STATES PATENT OFFICE 1,964,178

BRAKE LINING

Adolph Rosner, South Bend, Ind., assignor to Bendix Brake Company, South Bend, Ind., a corporation of Illinois Application October 27, 1930, Serial No. 491,499

18 Claims. (Cl. 154—52)

This invention relates to friction material suitable for use either as a clutch facing or as a brake lining.

The conventional friction material includes felted or woven asbestos as the principal ingredient the asbestos being impregnated with a binding substance or "dope" such for example as one of the heavy asphaltic residues or rubber.

This invention is particularly concerned with the molded type of friction facing or lining, it being the principal desideratum to disclose a simple continuous process for producing such a lining. Heretofore, molded linings have been produced at considerable expense of time, labor and materials, the usual practice being to cut lining sections from asbestos millboard stock which are then impregnated, shaped, cured and drilled as desired. Such cutting entails a certain amount of waste or scrap which at best must be rehandled and reprocessed to place in board form again. By my novel process, such waste is obviated, the lining being built up of one or more layers of suitably impregnated stock material which is then machine folded in such fashion as to provide a friction facing of the desired thickness. The lining stock as it emerges from the folding machine is then cut to length, cured to shape and otherwise processed, the entire operation being a continuous and substantially uninterrupted one effecting a molded type of lining as distinguished from the more expensive woven type. The stock may also be impregnated after the folding operation and subsequently processed as desired.

A further object of the invention resides in the provision of a lining, sinuous or undulating in longitudinal section and possessing the necessary physical characteristics such as hardness, unvaried coefficient of friction, tensile strength and absence of tendency to score the drum.

It is a further object to improve both the composition of the lining and the method of making the same with a view to eliminating the squealing or squeaking which is very likely to occur when a brake or clutch is being applied or is "taking hold" and which objectionable noise is extremely annoying.

A further object of the invention is to provide a lining so constituted as to obviate creeping of the same on the face of the brake shoe or other support to which the lining is secured, and also reduce the susceptibility to score the brake drum.

Figure 1:
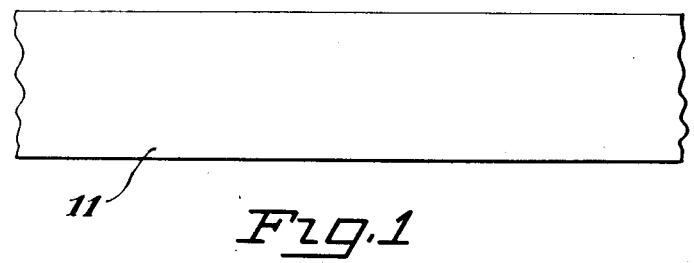

Other objects of the invention together with meritorious details residing both in the product and in the particular technique of effecting the same will become apparent from the following detailed specification and the accompanying drawing, in which:

Figure 1 discloses paper stock from which the lining is fabricated.

Figure 2:
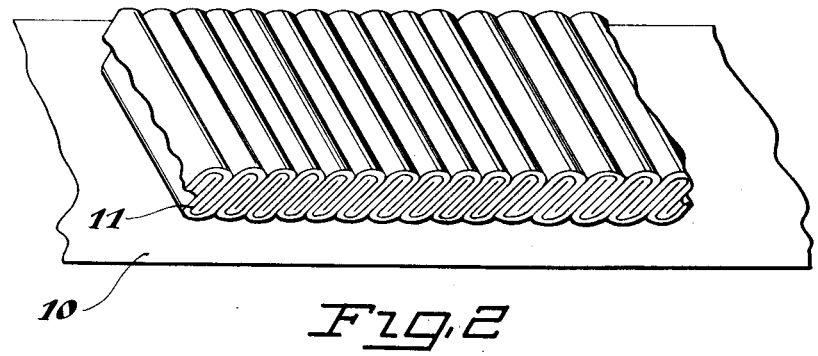

Figure 2 discloses the lining in an intermediate stage as it comes from the folding machine, the same being mounted on a paper strip to preserve the shape and folds of the lining.

Figure 3:
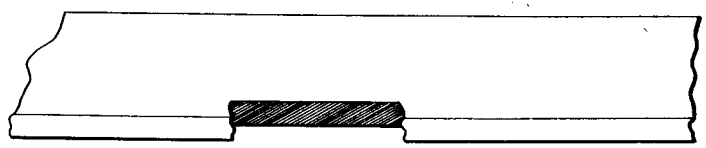

Figure 3 indicates a portion of the finished lining broken away in part to show, in longitudinal section, the sinuous or folded nature of the material.

Figure 5:
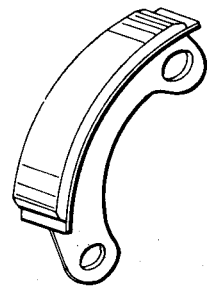
Figure 4:
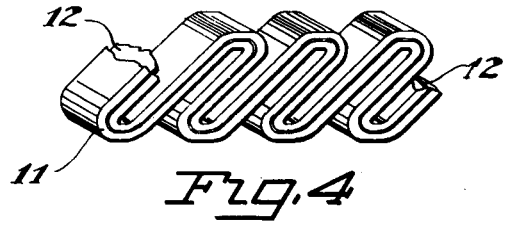

Figure 4 discloses an enlarged view, in longitudinal section, of one form of lining, the layers being slightly spaced apart, for clearness, and Figure 5 discloses the finished product as applied to a conventional type of brake shoe.

According to one process embodying my invention, one or more layers of the paper stock of Figure 1, whose width preferably, but not necessarily determines the width of the product, is fed into a suitable folding machine, preferably of the knife pleating type, the sinuous or undulating product of Figure 2 resulting. Preferably the folded stock is glued as it comes from the machine, to a supporting strip of ordinary heavy wrapping paper or cloth indicated by reference numeral 10 which serves to retain the folds in close proximity prior to the subsequent processing. A single layer 11 of paper may be used, but I prefer however to employ two or more of such sheets which are superimposed and folded together in the machine the thickness of the paper and the slope and spacing of the fold determining the thickness of the lining. If the fold has no substantial slope such as that produced by intermeshing gears, then the height of the fold determines the lining thickness.

If desirable, a sheet of lead foil 12, Figure 4, containing 1% to 4% of tin may be interposed between alternate sheets of paper, which foil may be perforated to insure the effective bonding of the plies of paper, the laminæ formed by the folds of the lining, merging together at the perforations by virtue of the binding material.

Alternatively, the lowermost layer of the lining may be a lead foil strip which may be perforated and which, in the finished lining, is placed next to the rim of the brake shoe or other supporting surface to be lined, the lead foil serving to obviate creeping of the lining on the rim face by virtue of its relatively high coefficient of friction with steel.

The paper material which is employed may be of suitable fibrous nature, but is preferably of the short staple asbestos variety impregnated as described hereafter.

A non-inflammable cellulose base paper may also be used, the major specification being that the paper be readily pleated and subsequently processed to form a lining of the necessary physical characteristics.

A very important phase of the invention relates to the impregnation or saturation of the paper with a suitable binder imparting to the matrix those physical qualities such as strength, hardness and coefficient of friction which are prerequisite in an effective lining. Preferably the paper is impregnated or doped during its manufacture, a water soluble phenolic condensation product being added to the beater mix together with an amount of cyanide salt such as sodium cyanide or potassium ferrocyanide or a combination of various cyanide salts. The fibres, which are preferably of cheap short staple asbestos, thus become thoroughly saturated with the binder and inorganic material, the subsequent heat of calendering of the paper stock being deliberately made insufficient to cure the synthetic resin binder, the water only being driven off. The cyanide salt which is thoroughly commingled throughout the fibrous matrix performs the very important function of melting at the high braking temperatures at the lining surface to lubricate the lining and thereby automatically lower the coefficient of friction. The salt in its fused condition furthermore serves to case harden the drum, a certain amount of carbon being fixed in the drum surface, thereby increasing its surface hardness and lowering its susceptibility to rust and scoring. Such a paper may then be kept in stock in a dampened condition or may be kept dry and before using, dampened sufficiently to permit the desired folding or pleating.

Under some circumstances it may be desirable to impregnate the paper just before pleating. With this end in view there is provided a paper which readily absorbs the impregnating material. Such a paper may then be saturated with any one of the well-known binders, such as an oxidizing oil, a synthetic or natural resin, or an asphaltic composition, or a combination of one or more of such materials. Preferably however, the paper is impregnated with a mixture of an aqueous solution of sodium cyanide and a water soluble phenolic condensation product. A small amount of alcohol may be added to the solution to disperse any emulsion or colloid phase that may be present. The parts by volume of the resin, water and cyanide solution are chosen so as to effect the desired physical characteristics of the product. One formula which gives an excellent product comprises fifty parts by volume of commercial water soluble phenolic condensation product, fifty parts by volume of a ten percent aqueous solution of sodium cyanide and sufficient alcohol to render the solution clear.

If desired, the impregnation may be facilitated by the use of a suitable introfier, or by carrying out the impregnation under reduced pressure. This would also tend to reduce alcohol losses if this vehicle is employed. Also, if desired, the fibrous material may first be lightly heated and submitted to a vacuum in order to more or less completely evacuate the pores or interstices of moisture thereby accelerating subsequent penetration of the saturant. The saturated paper is then sufficiently dried without curing to be effectively folded.

The partially formed lining of Figure 2 may be cut to length as it emerges from the folding machine and may then be punched and counter sunk to receive fastening rivets. The uncured lengths may then be riveted to the rim of a brake shoe, Fig. 5 and a clamping die pressed onto the outer face of the lining, whereupon the shoe with its lining is placed in a curing oven and properly cured. The curing drives off the volatile material, hardens and otherwise physically and chemically changes the lining to its final state. The lining may now be ground to give the proper surface contour, whereupon the brake shoe is ready for incorporation in the brake assembly.

If desired, the punching of the lining may be dispensed with and the stock cured directly on the rim of a brake shoe, the surface of the rim being first primed with a coat of the rather thick undiluted resin, thereby facilitating the adhesion between the lining and rim and dispensing with the rivets.

If the lining is desired as a finished article unattached to the brake shoe it may be cut to length as it emerges from the folding machine, molded and cured under pressure to the desired curvature and physical and chemical condition and then drilled for the fastening rivets and lastly surface ground.

It may also be desirable to fold the unsized or unimpregnated paper and then saturate the resultant strip disclosed in Figure 2. After being sufficiently dried to facilitate further handling, the stock is then processed in any one of the ways heretofore described.

The final product, disclosed in Figures 3 and 5, preformed to the desired shape, retains a faint outline of the folded paper stock as disclosed in Figure 3. A hard, wear resisting material is effected which is substantially homogeneous and of such cross-section and constitution as to provide a uniformly effective friction facing. The cyanide functions to lubricate and case harden as previously described; and together with the other constituents reduces the possibility of squealing and scoring; the lead, if employed, serves to raise the coefficient of friction and act as a lubricant in its melted state; the major constituents, namely, the fibrous material and the uniformly distributed resin or other binder function to give the desired physical constants; all of which constituents mutually cooperate to effect a very cheap and efficient molded lining fabricated by the simple continuous process heretofore described.

While there are described several specific embodiments of the invention, it is to be understood that these are given merely by way of example, for, as indicated, the particular construction of the article as well as the various steps of the process may be to a degree modified within the scope of the principles involved. It is intended therefore that the invention shall be limited, not by the descriptive matter set forth in the specification, but only by such limitations as are clearly imposed by the appended claims.

I claim:—

1. That process of preparing friction material comprising folding together sheets of dissimilar fibrous material to effect an intermediate product of the desired thickness and then processing said folded material to produce a finished product ready for use as a friction material.

2. That process of preparing friction material comprising folding together a sheet of fibrous material and a sheet of lead foil to effect an intermediate product of desired thickness and then otherwise processing said folded material to produce a finished product suitable for use as a friction material.

3. That process of preparing friction material comprising knife pleating a layer of short staple asbestos paper to produce a sinuous intermediate product having a definite thickness and thereafter rendering said folded product sufficiently hard and composite to function as a friction material having the desired coefficient of friction and other necessary physical characteristics.

4. That process of preparing friction material comprising knife pleating a layer of short staple asbestos paper impregnated with a binder to produce an undulating product having a definite thickness and thereafter curing said pleated product to render the same sufficiently hard as to function as a friction material having the desired physical characteristics.

5. That process of preparing a friction material comprising impregnating a porous short fibre asbestos paper with a saturant of water soluble phenolic condensation product, drying said paper to drive off the water, folding the paper into pleated form to impart a thickness to the ultimate product and then cutting, curing, forming and otherwise processing said folded material to complete the finished product.

6. That process of preparing a friction material comprising impregnating a bibulous short staple asbestos paper with a saturant of water soluble phenolic condensation product and a cyanide salt, drying said paper to drive off the water vehicle, folding the paper into pleated form to impart thereto a product of definite thickness and then cutting, curing and otherwise processing said folded material to complete the finished product.

7. That process of preparing a friction material comprising preparing a paper of short fibre asbestos having uniformly distributed throughout its fibres an inorganic salt and an uncured, water soluble, condensation product, machine folding said paper to effect an undulated strip of a thickness dependent upon the nature of the fold, and then cutting said paper to length, curing and otherwise treating the same to impart the desired physical constants to the finished product.

8. That process of preparing a friction material, comprising preparing a paper of short fibre asbestos having uniformly distributed throughout its body a cyanide salt and an uncured water soluble condensation product, machine folding said paper to effect a sinuous strip of a thickness dependent upon the nature of the fold, securing said folded material upon a pliable support as it emerges from the machine, and then cutting said paper to length, curing and otherwise treating the same to impart the desired physical constants to the finished product.

9. A process of making a brake lining comprising superimposing a strip of paper impregnated with an uncured binder upon a strip of lead foil of like width, folding the two strips together and then heating the folded material to cure the binder and thereby effect a hardened finished product.

10. A process of making a brake lining comprising superimposing a strip of impregnated paper upon a strip of lead foil, folding the two strips together, securing the folded material to the rim of a brake shoe and then heating the shoe with its attached potential lining to cure the lining.

11. A process of making friction lining comprising immersing a strip of short staple asbestos paper in an aqueous organic binder solution containing an amount of inorganic salt, rendering the paper sufficiently dry of water to be capable of readily folding the same, feeding the strip into a folding machine there to be folded to effect an intermediate lining product of predetermined thickness, cutting the folded material as it emerges from the machine into the desired lengths of lining and thereafter shaping, curing, drilling and surface grinding the material to complete the finished product.

12. A friction facing comprising a sinuous strip of fibrous material impregnated with a resin binder having a limited amount of cyanide salt mixed therewith.

13. A friction material adaptable for use as a clutch or brake facing, comprising a fibrous matrix impregnated with a synthetic resin binder, a cyanide salt and lead.

14. A friction material adaptable for use as a clutch or brake facing comprising a short staple asbestos matrix containing lead and tin and impregnated with a resin binder and sodium cyanide.

15. A friction material comprising a sinuous fibrous matrix presenting inclined laminae in longitudinal section.

16. A friction material comprising a sinuous fibrous matrix presenting inclined laminae in longitudinal section, said matrix being impregnated with a filler to produce material of sufficient tensile strength and hardness.

17. A brake lining comprising alternate layers of fibrous material and lead foil folded to present inclined laminae in longitudinal section and impregnated with a resinous binder.

18. A brake lining comprising alternate layers of fibrous material and perforated lead foil folded to present inclined laminae in longitudinal section.

ADOLPH ROSNER.